Figure 1:
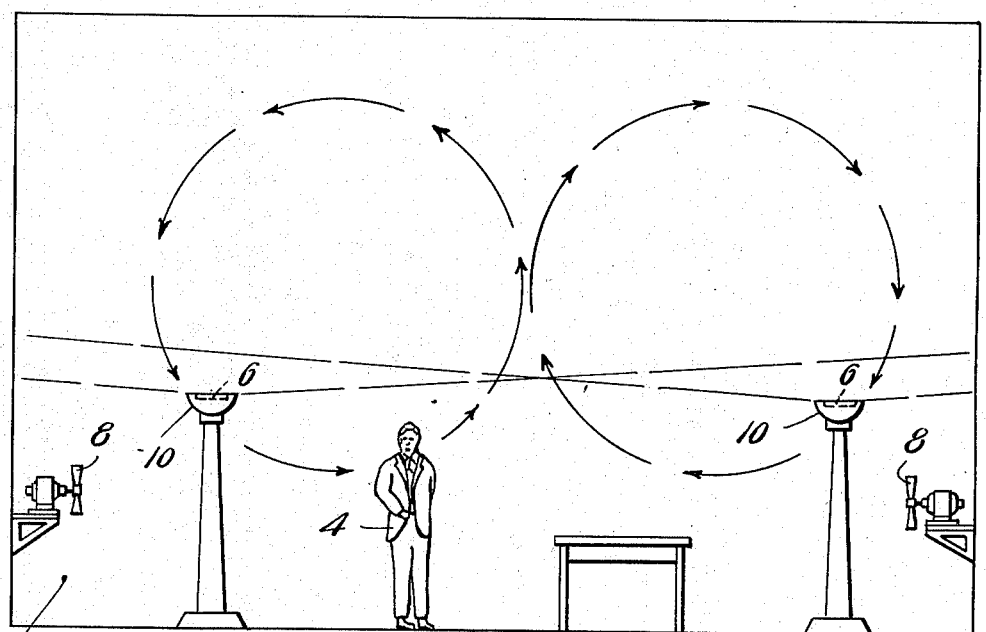

April 30, 1940.   G. M. FAIR ET AL   2,198,867
METHOD OF AND APPARATUS FOR PREVENTING INFECTION
Filed Sept. 18, 1937   3 Sheets-Sheet 1

Inventors.
William Firth Wells
Gordon M. Fair
By David Rines
Atty.

Patented Apr. 30, 1940

2,198,867

UNITED STATES PATENT OFFICE 2,198,867

METHOD OF AND APPARATUS FOR PREVENTING INFECTION

Gordon M. Fair, Cambridge, Mass., and William Firth Wells, Swarthmore, Pa.

Application September 18, 1937, Serial No. 164,514

2 Claims. (Cl. 250—43)

This invention relates to practical means for reducing or eliminating air-borne infection by the proper irradiation of the air with lethal light. Their application to the sterilization of gases and air has also been proposed, but no proposal has ever proven operative within reasonable time in the sterilization of the large volumes necessary to accomplish the useful purpose herein set forth. This has not been due to any deficiency in the power of light but to the manner and condition of its application.

We have discovered the nature of the factors which make it possible to so greatly increase the effectiveness of application of lethal light to the continuous disinfection of large volumes of air as to satisfy the conditions required for sanitary ventilation. We have found that (1) In relatively dry air the lethal power of ultra-violet light is from ten to one hundred times greater than is found when organisms are exposed on the surfaces of agar plates or are irradiated in water or other denser media, thus greatly expanding the active range of lethal light beyond any previously suggested;

(2) This action relates particularly to microorganisms suspended in very fine particles which constitute the principal hazard in many cases, but which in any case are difficult to remove by mechanical processes effectively applied against larger particles where light is less effective.

(3) Light is most lethal in dry air so that during the colder weather when air is artificially heated, and in air conditioning where recirculated air is reduced in humid content, it is most effective; an increase of 25 grains of moisture per pound of dry air, for example, may cause a loss of about 90 per cent in bactericidal power;

(4) The most useful lethal light is not absorbed appreciably in passage through air, so its effectiveness is preserved throughout a long range. The larger the space capable of lethal irradiation by a light source, the greater is the amount of light energy which can be utilized.

Further investigation of the quantitative physical factors involved in the application of lethal light have revealed the practical manner of effective application for great reduction of numbers of organisms introduced into an enclosed atmosphere before they can be carried by air currents to a new site of infection. It has been found that the number of organisms killed is proportional to the total amount of lethal light energy intercepted by the living organisms. The quantity of lethal light intercepted by the living bacteria depends upon the product of three factors, (1) the lethal light intensity to which each organism is exposed, (2) the time of exposure to lethal light of determined intensity, (3) the numbers of organisms surviving at each moment of time. Formulations derived from the separate arts of illumination, ventilation and disinfection apply to the integrated product of light intensity, exposure time, and survival number, which defines the bactericidal work done by lethal radiation.

Where the product of light intensity, exposure time, and survival number is determinate for each moment in time, the integral can often be mathematically expressed in convenient form. The equation for several ideal combinations may serve to elucidate the significance of the general law as well as define the vulnerability units of different organisms and lethal units of light.

Examples will hereinafter be given indicating the importance of space-time relations, and of motion of the air containing the micro-organisms.

If $N_0$=the number of micro-organisms or $D_0$ the bacterial density before, and $N$ or $D$ the number or density after irradiation of organisms with a vulnerability of $K$, by light of lethal intensity, $I$, for time $t$, then $$\log_e \frac{N}{N_0} = \log_e \frac{D}{D_0} = -KIt$$

and at $r$ distance from a source $I_0$, $$= -\frac{KI_0 t}{r^2}$$

and in a sphere of $R$ radius, source at center, is $$< -\frac{3KI_0 t}{R^2} \text{ and } > -\frac{1.2 KI_0 t}{R^2}$$

(the actual value of the coefficient being determined by the ratio of mixing velocity to killing rate, being lesser for quiescent and greater for rapidly mixed air) and approaching a source of velocity $v$, from $+\infty$ to $r$ distance from source $$= -\frac{KI_0}{vr}$$

and passing the source (from $+\infty$ to $-\infty$) on a straight line $r$ distance from source $$= -\frac{\pi K I_0}{vr}$$

and for a cylinder of $R$ radius with source in axis (from $+\infty$ to $-\infty$) is $$< -\frac{2\pi K I_0}{vR} \text{ and } > -\frac{1.24 \pi K I_0}{vR}$$

(the actual value of the coefficient being determined by the relation between turbulence and killing rate, being lesser for stream-line flow and greater for highly turbulent flow.)

The vulnerability constant K for any organism may be specified in terms of the vulnerability of a particular organism, such as *B. coli*, taken as unity. It has been found for most vegetative bacterial cells K does not deviate widely from unity. For given time and length units then $I_0$ defines the bactericidal power of the source. Values of $I_0$ thus determined, for various lights have established the fact that those used for illumination, even when emitting biologically active ultraviolet such as that found in sunlight, have such a small proportion of abiotic light as to have precluded their use for sterilizing purposes. In fact, every effort has been made to exclude wave lengths shorter than 2900 Angstrom units because of the harmful effects which may result from exposure of the eyes. Their presence at all is evidence of the difficulty of cutting the spectrum sharply by media which transmit what for illumination or vitamin production are the essential rays.

Maximum efficiency is approached when the light is so distributed, or the organisms are so distributed, that the integrated products of luminous flux by the time of exposure are equal for each living organism. This occurs with uniform distribution of light when the organisms are uniformly distributed in fixed position; when without uniform distribution of the light the air is mixed with infinite rapidity; with uniform cylindrical air flow when the light is uniformly distributed in a plane normal to the line of flow; and with a concentrated light source when the velocity varies inversely with the distance of the flow line from the axis through the light; or when turbulence is infinite.

Consideration of these factors will reveal the reason why former proposed methods have been inoperative, and why the new manner and condition of application described in this application has proved to be practical. It has, for instance, been proposed that air be circulated through a small chamber confining the lethal light. It is obvious from the description that the number of organisms contained in the volume so irradiated must be a very small proportion of those contained in the room which it aims to purify. Even complete killing of a small proportion of the organisms does not greatly affect the number remaining in the room. Hiding the light in a small box or chamber greatly reduces the amount utilized. To increase the number of living organisms intercepting lethal light by increasing the velocity of flow cuts down the time of exposure and reduces the percentage of organisms killed.

We aim primarily to increase the amount of lethal light intercepted by the living organisms introduced into the air of the enclosed space before reaching a point so protected, to more than that represented by one erg per square millimeter of light of 2537 wave length. This amount of light will be adequate to accomplish a high reduction in the risk of infection.

Thus it has been found practicable by the proper application of the light to accomplish a reduction throughout the space of approximately 50 per cent per minute which corresponds to an average lethal light flux of 2537 wave length of approximately two ergs per square millimeter per second.

This can be accomplished in the simplest manner by irradiating substantially large proportions of the enclosed space with lethal light and causing the larger circulation within the room to bring all living organisms within the irradiated zone within reasonable times. Those parts of the room which the eyes would occupy in the use of the room are carefully shielded or in special cases the quantity of light is reduced in the zone of occupation to a degree harmless to the person where the eyes are shielded, or reduced to a degree which is not injurious to the eyes in the zone of occupation, or in special cases where great intensity is desirable and the persons subject to discipline special protection may be provided.

Another mode of accomplishing the purpose is to circulate a substantial proportion of the air through a chamber with sufficiently large volume to permit a sufficiently slow rate of flow so that the time of exposure to a sufficiently high intensity of light brings about the required interception of lethal light by the living organisms in the room. This mode of application is mechanically more difficult and expensive but it can be applied in special cases where the circumstances warrant. Oftentimes, the two methods can be suitably combined by utilizing space within the room for irradiation of the air drawn from the room. Another modification would appear where air is being withdrawn from one room which may contain infection and discharged into another. A light barrier may thus be applied to prevent the passage of microorganisms from the first to the second.

To better define the manner and condition of application herein set forth, several examples of its practical application are presented with the results of efficiency tests.

That microorganisms in the air of the room are, in fact, destroyed by the said ultra-violet light may be demonstrated by very simple tests. Examples of such tests are given in Science, September 20, 1935, vol. 82, No. 2125, pages 280, 281. Thus, a culture medium in the form of a diluted broth containing colon bacilli was atomized into a dark room of about 2000 cubic feet capacity, so that a cubic foot of the air in the room was infected with more than 1000 living organisms. The atomized droplets evaporated almost immediately and left the bacteria suspended in the air. Air was then drawn out of the room by the method described by the said W. F. Wells in a paper, entitled, "Apparatus for Study of the Bacterial Behavior of Air," published in the American Journal of Public Health, vol. XXIII, No. 1, January, 1933. A first sample, containing ten cubic feet of the air of the room, withdrawn after a lapse of ten minutes, showed 9,500 living *B. coli*. Owing to the natural disappearance of living *B. coli* in air by death, diffusion, settling and other factors, a second sample of ten cubic feet of air, taken fifteen minutes after the beginning of the taking of the first sample, showed 2,500 of these living organisms, that is, 7,000 *B. coli* per sample; 74 per cent had thus disappeared in fifteen minutes. A third sample, taken fifteen minutes later still, showed 885 living *B. coli* in the same volume of air; that is, 1,615 *B. coli* per sample, or 65 per cent, had disappeared in fifteen minutes. This relatively constant rate of decrease in a given interval of time is a well-established fact. It is found, furthermore, that the rate tends to drop off somewhat, due probably to the survival of a larger proportion of the hardier organisms as time progresses.

At this point, a General Electric Company Uviarc, high-pressure, mercury quartz-vaporelectric lamp 6 in the room was energized. The length of the arc was about four inches. During the next twelve minutes, while the lamp was building up its emission of ultra-violet light, a sample was taken for ten minutes, withdrawing ten cubic feet of air from the room. In this time, the number of living organisms in a ten-cubic-foot sample of the air was decreased to one, which single organism probably originated in the sampling tube; that is, 884 B. coli per sample, or 99.9 per cent, had disappeared in twelve minutes. Had there prevailed the normal rate of disappearance that obtained in the absence of irradiation, a rate of disappearance of not more than about 70 per cent, or a survival in the air of not less than about 265 living B. coli, would have been expected. A final withdrawn sample of the same volume of air, taken fifteen minutes later, in the same time interval, contained no B. coli whatever.

In a second test, a duplicate amount of the same culture of B. coli was atomized into the room, with the ultra-violet light turned on and operating at normal current. Ten cubic feet of air, withdrawn while the culture was being atomized into the room, contained only 510 living organisms, instead of the expected 9,500. A sample taken fifteen minutes later, as in the previous procedure, contained not a single organism.

As a further illustration of the number of micro-organisms drawn out of a room which had been heavily inoculated with micro-organisms, record might be made as follows:

A first tube, which drew the air out of the room at a rate of ten cubic feet per minute, for ten minutes, contained 4,000 living organisms. The second tube, which drew the air out of the room at the same rate, fifteen minutes later, contained 830 organisms, that is, there was a disappearance due to normal influences of about 79 per cent. The third tube, which drew the air out of the room at the same rate, fifteen minutes later, immediately after a two-minute exposure of the room to the said ultra-violet light, contained no organisms; that is, the reduction was 100 per cent, instead of the expected 79 per cent or less.

Experiments showing the lethal power of ultra-violet light in a flowing volume of air are described in an article by W. F. Wells and M. W. Wells, entitled, "Air-borne Infection," in The Journal of the American Medical Association, November 21 and 28, 1936, vol. 107, pp. 1698 to 1703 and 1805 to 1809. The light sources used in these installations were Hanovia quartz mercury vapor Geisler tubes which are now listed as Safe-T-Aire tubes. Their characteristics are as follows: With line voltage of 118 volts A. C. 60 cycle, with 3000 volt transformer 30 m.a., each tube takes 8 watts, 30 m.a., and at 6 inch distance has a bactericidal ultraviolet (i. e., under 3100 Angstroms, mostly 2537 Angstroms) equals 260 microwatts per square centimeter.

Figure 2:
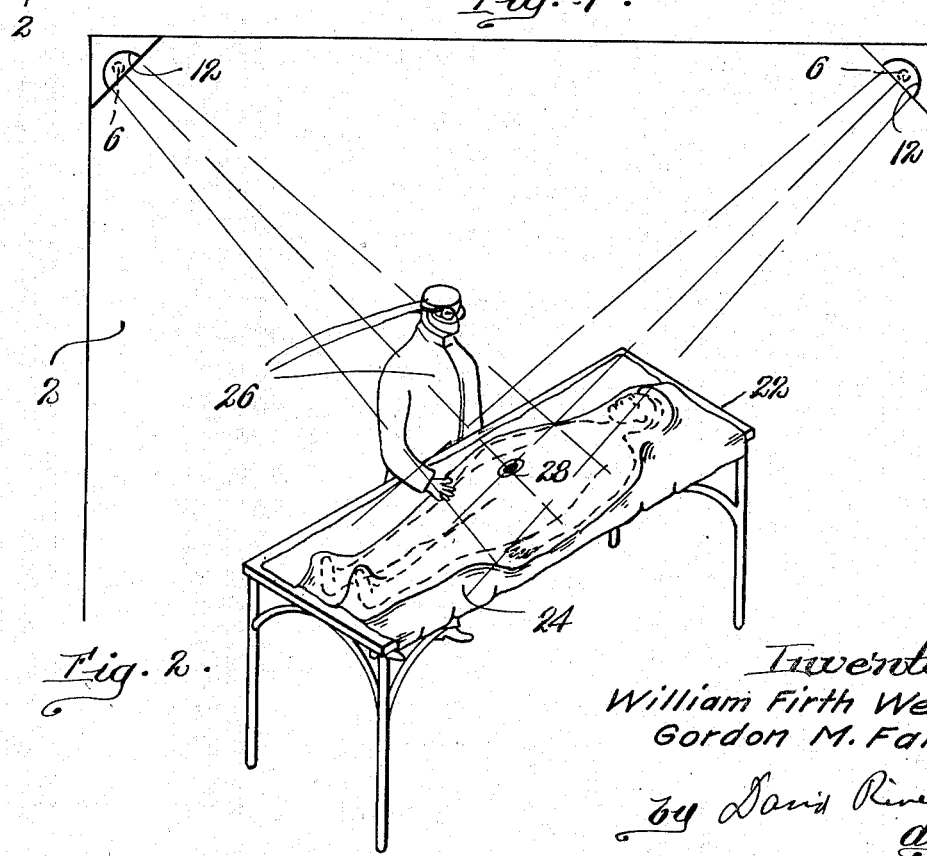
Figure 3:
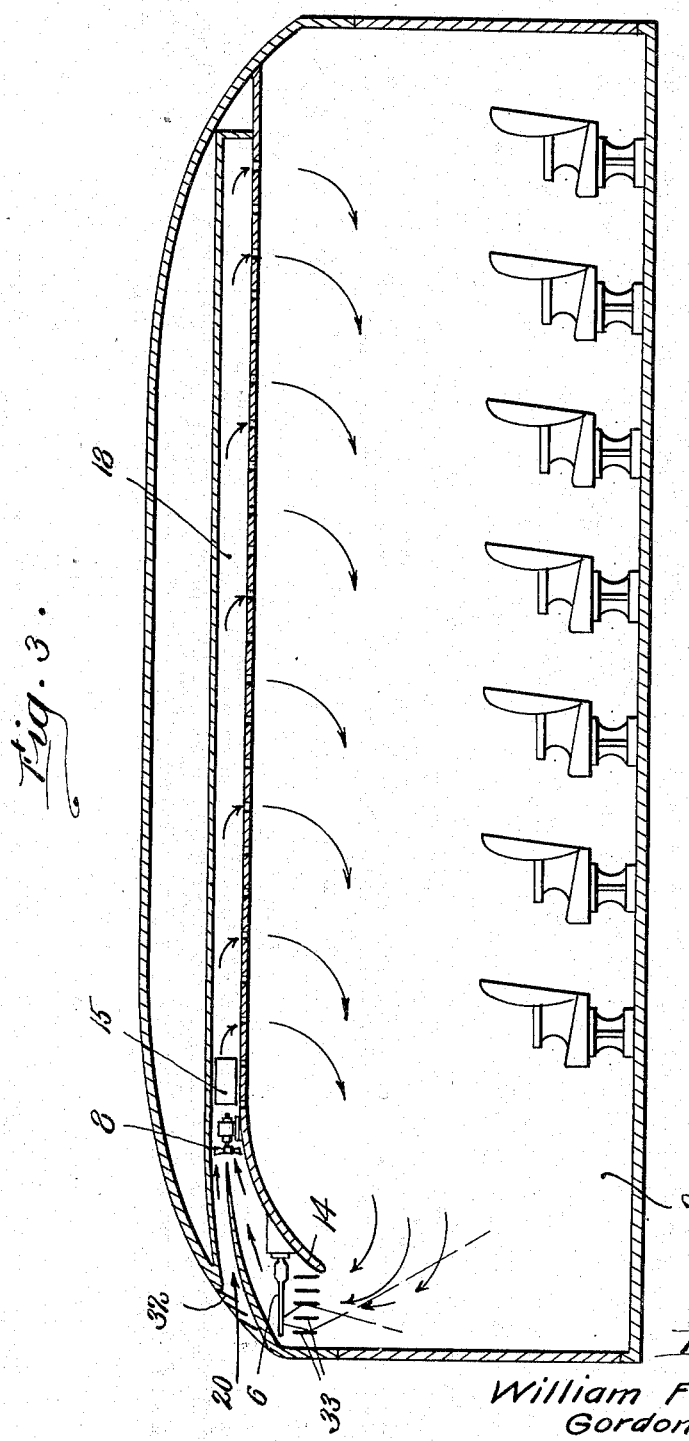
Figure 4:
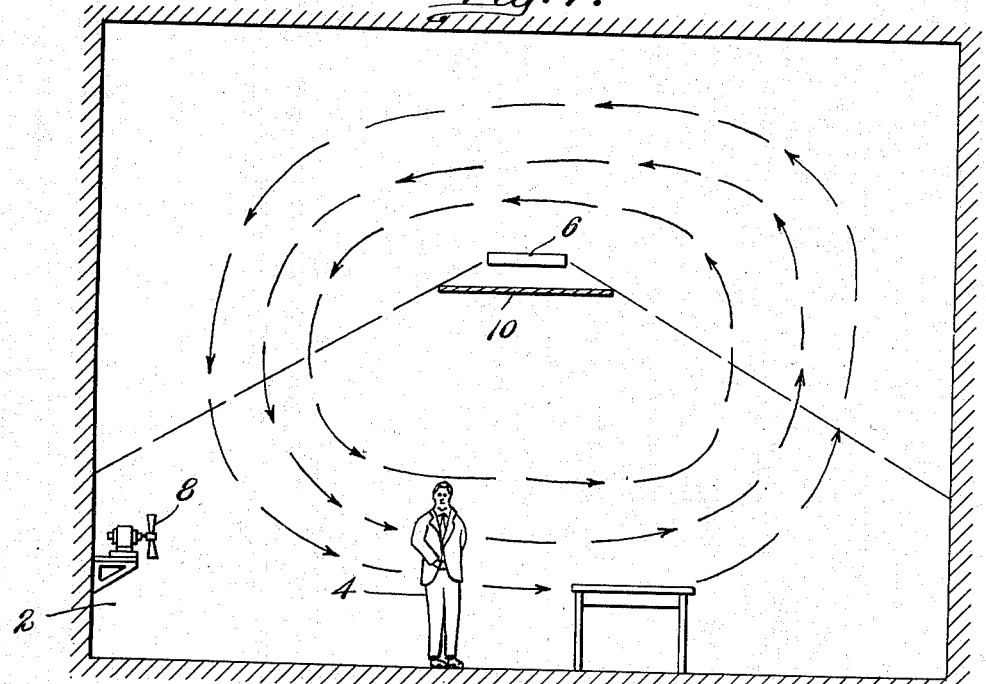
Figure 5:
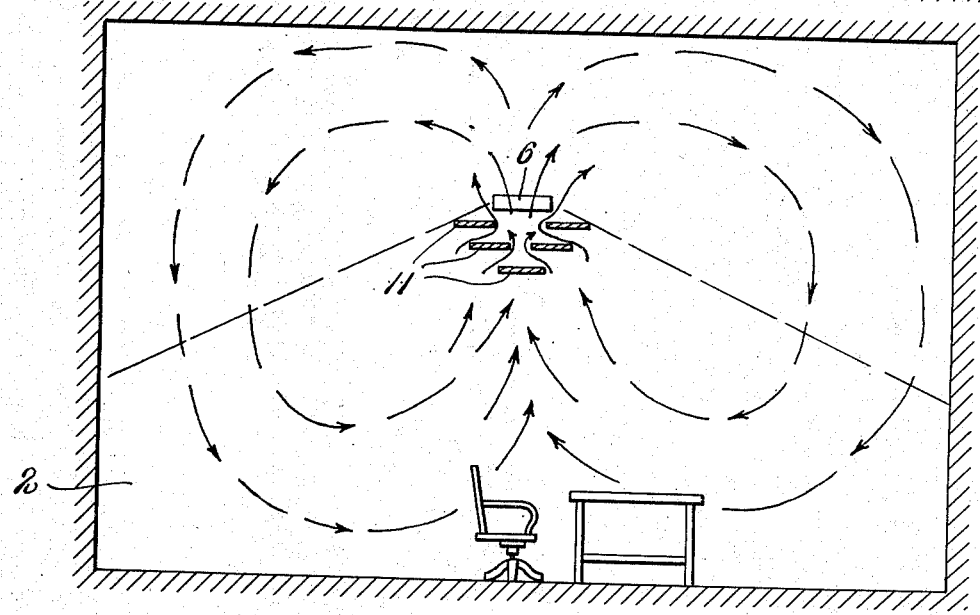

In the accompanying drawings, Fig. 1 is a diagrammatic view of a room the air of which is substantially freed from living micro-organisms in accordance with the present invention; Fig. 2 is a similar view of an operating room; Fig. 3 is a similar view illustrating the application of the invention to the recirculated air of an air-conditioned railroad car; and Figs. 4 and 5 are views similar to Fig. 1 of further modifications.

The air of inhabited rooms, such as the room shown at 2, may become infected with micro-organisms in a number of different ways. If, for example, an occupant 4 of a room is talking, coughing or sneezing, he may discharge large numbers of micro-organisms into the atmosphere, and these may endanger the health of other occupants by being inhaled or otherwise deposited on or in a person, animal or inanimate substance. Micro-organisms may also be discharged into the atmosphere by sweeping, dusting, brushing and other rubbing operations which detach them from the surfaces to which they have adhered and may subsequently be inhaled or otherwise deposited on or in a person, animal or inanimate substance.

Ordinarily, the droplet nuclei are so rapidly dispersed in the outside air that there is but little danger of infection thereby. In crowded or poorly ventilated spaces, however, they constitute a real menace. Even well ventilated buildings are not free from this danger, particularly where the same air, after conditioning, is recirculated, so as to be used over and over again for breathing, for such recirculation merely adds to the bacterial concentration of the recirculated air.

Many proposals have been put forward for minimizing these effects, among them sprays of disinfecting substances, gaseous fumigants, the mechanical interception by filters, and the admission of sunlight and even of ultra-violet light. Most of these proposals have been found to be ineffective, uncontrollable, or of very limited or differential application.

Prior proposals involving the use of ultra-violet light have been mere surmises, based upon the knowledge that all light, both visible and ultra-violet, in all parts of the spectrum, has some killing power.

Ultra-violet-light waves range from about 3,900 Angstrom units, the lower wave-length limit of visible light, down to around 10 Angstrom units in length. The sun's rays contain vibrations as low as about 2,900 Angstrom units. All ultra-violet light is not, however, effective to carry out the present invention.

According to the present invention, however, it has been discovered that micro-organisms are rapidly destroyed by subjecting the air that contains them to the action of a substantial emission of ultra-violet rays of less than about 2,800 Angstrom units, the maximum killing effect in the range in which we have worked apparently being obtained near the resonance band at about 2,537 Angstrom units. That micro-organisms in air can be destroyed so rapidly and effectively, as indicated by tests some of which are described hereinafter, by ultra-violet light of these critical wave lengths, is a discovery that has heretofore escaped all workers in the art. There is nothing in the experiences involving the common practice of subjecting liquids to ultra-violet light that would have suggested this property.

In the tests described below, these tubes were installed as unit sources and the number will be regarded as indicating the strength of the source. These tests include representative conditions diagrammatically illustrated in Figs. 1 to 5, which refer to these examples of the application of this invention.

In Fig. 1, the air currents, indicated diagrammatically by circular arrows, carry the bacteria in air currents past ultra-violet lamps 6, assisted, if desired, by electric fans 8. The normal currents in the room would, however, serve somewhat the same purpose. The level of the lamps 6 is indicated enough above the normal eye level to assure protecting the eyes of the occupant 4 from direct radiation. The lamps 6 are free to irradiate the whole upper portion of the room above the eye level. The reflecting bowls 10, in this case, serve to goggle the occupied portion of the room without destroying the currents traveling from the person 4 through the light 6 before returning to another person 4. In this manner, one person 4 is protected from another person 4. The number of lamps 6 will be determined by the intensity necessary to accomplish the desired removal rate described in the tests.

The lamps 6 are preferably disposed as low as is convenient for the use of the room, so as to increase the volume of the irradiated space, to approach the maximum irradiated space in the room with a minimum allowance of unirradiated space for the desired use of the room. The theoretical limit, of course, would be to have the whole room irradiated, somewhat as in Fig. 2; but shields or screens would perhaps be needed to protect the occupants 4 from the harmful rays of the lamps 6, as illustrated and described in a copending application, Serial No. 26,626, filed June 14, 1935, of which the present application is a continuation-in-part. The drawings and the specification of the present application have been changed in some particulars from the disclosure of the said prior application, merely for clarity; as far as possible, the significance of the reference numerals has been preserved.

Fig. 4 herein is reproduced from the said copending application, with the lamp 6 and the screen 10 positioned just below the lamp 6, in an upper region of the room, to protect the floor and the lower portions of the walls of the room from the action of the ultra-violet light, being suspended from the ceiling of the room. As in the case of Fig. 1, the lamp 6 of Fig. 4 is free to irradiate the whole upper region of the room. The shield or screen 10 may be of such material as to permit the passage of only the desired portions of the spectrum of the source of ultra-violet light. If the ultra-violet lamp 6 is up high enough, a separate shield or screen 10 may, in some cases, be dispensed with, because the interposed layers of air would themselves act as a shield or screen.

Fig. 5 herein, also reproduced from the said copending application, illustrates a method of circulating the air from the shielded or screened portion of the room, thus carrying it through the irradiated zone of the room, without the aid of the fan 8. The shield or screen is here shown as constituted of a number of smaller shields or screens 11, disposed in different layers and overlapped. The heat of the lamp 6 in the sensibly confined space above the shields or screen will draw air from the shielded or screened portion of the room in between the openings between the smaller shields or screens 11, thereby inducing circulation of the air and, at the same time, bringing the air into close proximity to the lamp where ultra-violet radiation is particularly intense, thus ensuring rapid destruction of any living micro-organisms the circulated air may contain.

Though the present invention may be used elsewhere, as in operating rooms, sick-rooms, or hospital wards, it is designed primarily for the purpose of preserving the health of persons in ordinary rooms; for example, for preventing infection in school rooms, auditoriums, factories, clinics, common carriers, and theatres, and wherever else appreciable numbers of people are congregated in a confined space, and the chance is high of some of them infecting the air and others being infected by the air so infected. The invention is useful also in vaccine and bacteriological laboratories and other establishments where bacteria in the air may have injurious effects upon the procedures. The micro-organisms liberated by a person in a room will become killed almost immediately upon their liberation or projection into the atmosphere in the vicinity of their liberation and thus will not be so prone to infect any other person in the room, as they are more or less certain to be killed while on their path of travel to such other person by the ultra-violet irradiation of that path. The invention is useful also in many industrial applications, especially food-producing or food-storing operations, where various air-borne organisms may bring about the contamination of the products. It is useful also for the protection of animals against infection.

The ultra-violet light may also be utilized in any air supply which it would be desirable to disinfect before permitting it to enter the room, as illustrated in connection with the railroad car of Fig. 3. The car may represent any air-conditioned room, with ventilation depending upon the withdrawal of air, its treatment, and its return to the same or other occupied room. In the present case, a railroad car is taken as a simple example. The air is conditioned by forcing it with a fan 8 and a dust-removing filter, washer or precipitator 15, in a duct 14. In this case, the lamp 6 would be introduced into the duct 14 at a point where it cannot injure the persons occupying the car. Air, in passing the lamp, would become substantially sterilized on its way to the point of use in the room of the car. In connection with air-conditioning, or ventilation systems, for public buildings, schools, hospitals, storage rooms, and factories, for example, the use of the lamp 6 in the inlet air duct 14, Fig. 3, would insure a supply of substantially sterile air to the room or systems of rooms of the car, building, etc. The air is shown recirculated from the occupied room, in connection with air supply or conditioning, by means of the fan 8, the air passing out of the room or rooms, by way of the exhaust ducts 18, and the recirculated air being substantially sterilized as it passes baffles 33 and the light 6 within the inlet duct 14 of the air-conditioning system, and returned, in a substantially sterile condition, to the occupied room or rooms 2. The fan 8 may draw fresh air from an outside source, as by way of the air intake 20, in addition to merely recirculating the air by way of the exhaust ducts 18. The inlet 20 is shown provided with louvres 32 by means of which the proportion of incoming fresh air can be controlled.

The air, having been subjected to contamination in the room, may, at the same time, further be conditioned physically, as by filtering, humidifying, ionizing, and heating or cooling to control the temperature, during the recirculating process by some device included within the scope of the apparatus 15, as is also illustrated in Fig. 3.

In summer, for example, when the air is dehumidified, the air should be sterilized after dehumidification; and in winter, when the air is humidified and warmed before it is returned to the room, it may be better to subject it to the action of the ultra-violet rays before humidification. The humidification and de-humidification may be effected by the same sprays, merely by regulating their temperature. If they are constituted of very cold water, the moisture in the air becomes condensed to the saturation point when subjected to this cold temperature, but it becomes dry on warming up. Irradiation in the room itself would then become more effective because the relative humidity is then at the lowest point. The same air is thus treated over and over again and recirculated throughout the system.

The combination of the filtration and the said ultra-violet light, in the case where the organisms are grouped in large clusters, thus effects what neither can produce by itself; the large clusters are removed from the conditioned air by the filters and the individual organisms and the smaller clusters, that do pass through the filters, are killed by the said ultra-violet light.

Fig. 2 illustrates the invention as applied to an operating room where the condition above discussed is reduced practically to its theoretical situation, in order to get the maximum possible disinfecting action, to cover the occupants, such as the person to be operated upon, and the surgeon, nurses, the anesthetist and others. Instead of using the previously mentioned shields or screens, the person on the operating table 22 is covered by a shield or screen 24 in such a way that he would not be burned. The surgeon is similarly protected by shields or screens 26. The nurses, anesthetist and others, not shown, would be similarly shielded or screened. Only the wound 28 is not shielded or screened, though this, or any other, operating area, may also be shielded or screened, if desired, for reliance is placed, not upon exposure of the wound to the ultra-violet light, but upon irradiating the space in the room. A maximum amount of space is thus irradiated. There are also other situations in micro-biological technic where such shielding or screening is desirable.

An operating room, approximately fifteen feet square and with a twelve-foot ceiling, was equipped with four Safe-T-Aire tubes 6 installed in pairs at the middle of the angle of the side walls and ceiling, as shown in Fig. 2. Each pair of tubes was set in an aluminum reflector 12 which focussed the light in some measure upon the site 28 of the operation (the approximate center of the room), somewhat as indicated diagrammatically in Fig. 2. A small atomizing machine, used as an infector, was placed successively in three corners of the room and maintained in operation continuously throughout the test. The air centrifuge was used as an infectee drawing air from the site 28 of the operation. Fifteen ten-minute samples were taken, with one minute intervals between. The first three samples in each corner were taken with the lights off, the fourth and fifth of each series being taken with the lights on. The counts from the samples were as follows:

|  | Corner I | Corner II | Corner III |
|---|---|---|---|
| Without light | 489<br>1080<br>2376 | 883<br>1212<br>1489 | 1880<br>2765<br>3484 |
| With light | 4<br>0 | 4<br>0 | 0<br>0 |

The destruction of B. coli atomized into this room by one minute's irradiation is spectacular.

It is believed to be a remarkable discovery that four small quartz-mercury Geissler tubes, consuming only about 35 watts, can produce a reduction of more than 99.9 per cent and even more than 99.99 per cent per minute in an air content of so great extent as above indicated. Such results would be impossible by means of any ventilation tolerable in an operating room. No inconvenience to the operators was involved beyond the wearing of ordinary spectacles or an eye shade. Incidentally, these were both dispensed with by some of the personnel without any noticeable ill effects.

A second example is provided by a barrier thrown across the corridor of a contagious hospital to separate patients harboring the causative agents of different contagious diseases. Again, four lights were installed on the side walls so as to irradiate a section of this corridor, about eight feet square, with the exception of a narrow zone at eye level which was closed to the passage of organisms by an air stream drawn past the lights.

The tests were made by placing the infector on one side of the barrier with the air centrifuge on the other side, and determining the number of B. coli passing from the infector to the infectee through the barrier with the lights on and the lights off. The positions of the infector and infectee were then reversed so as to equalize the results of air movements. In the averages of six compound tests, 506 B. coli went from the infector with the lights off, and 6.4 with the lights on. In the opposite direction, the figures were 317.3 with the lights off, and 7.3 with the lights on. With this experimental installation, therefore, less than 2.3 per cent of the B. coli escaped through the light barrage.

A third example of application after the manner indicated in Fig. 1 or 4 is given by a rectangular classroom of approximately 10,000 cubic feet capacity and a floor area of 30 x 35 feet. Two Safe-T-Aire ultra-violet burners 6 were set in the middle of the room above an aluminum reflector or screen at eye level, so as to irradiate the upper part of the room. The reflectors or screens 10 were so positioned with respect to the ultra-violet light sources 6 as to approach the maximum irradiated space in the room with a minimum allowance of unirradiated space for the desired use of the room. The theoretical limit, of course, would be to have the whole room irradiated, as illustrated in Fig. 2.

An inflector was put on the floor midway between the lamp and one end of the room, and the centrifuge was placed on the floor midway between the lamp and the opposite end of the room. A large concentration of B. coli were projected into the room over a five or ten-minute interval and the disappearance rate determined with and without the light. In two experiments, the disappearance rate per minute was (1) 45.8 per cent with the light and 3.1 per cent without the light, and (2) 58.1 per cent with, and 14.0 per cent without, the light. Subtracting the natural disappearance rate from that with the light, we obtain 42.7 per cent removal per minute by the light in the first test and 44.1 per cent in the second test. It can be seen that the light was eliminating living organisms at a rate which would require, by air dilution, a flow of pure air of 4,270 cubic feet per minute in the first case, and 4,410 cubic feet per minute in the second case to accomplish the same purpose. It is obvious that lethal light is not only an extremely economical means of eliminating air-borne infection during periods when people congregate in rooms with closed windows but it accomplishes results which could not be obtained by any other means of venting infection.

A fourth example, as in Fig. 3, is provided by the special conditions met with in the air-conditioning of railway cars. Here, 85 passengers may, with modern systems of air conditioning, commonly share a volume of 5,000 cubic feet of air, with, perhaps, a renewal of 300 cubic feet of air per minute and a recirculation of 1,700 cubic feet of air per minute. If lights can be installed so as to remove the larger part of the infection passing through the recirculation system, the infection-venting efficiency may approach a value more than five times that produced by the introduction of the new air. The bacteriological results obtained by the introduction of three Safe-T-Aire tubes in an experimental car are given as follows: in test (1), 3,155 B. coli per ten cubic feet of air were entering the recirculation system, while only 242 were emerging giving a percentage reduction of 92.3 per cent; in test (2), 2,425 B. coli per ten cubic feet entered, and 229 emerged, showing an efficiency of 90.6 per cent reduction; in test (3), 1,475 B. coli entered and 25 emerged, an efficiency of 98.3 per cent reduction. Under these exceptional conditions where a very large recirculation is possible and necessary, it becomes practicable to greatly improve the sanitary conditions by the removal of air, its purification and reuse. In this case, we obtain a venting equivalent of approximately one-third of the air space per minute.

Since the destruction of the organisms represents the sanitary equivalent of removing the amount of air containing those organisms, and replacing it with air free from those organisms, we may consider it as a ventilating equivalent of such a volume of air. That is, 90.6 per cent of 1,800 represents the volume of air containing the same number of organisms as were removed. But as the 1,700 is approximately one-third of the 5,000 cubic feet of air in the car, the killing power in the car itself may be expressed in terms of the equivalent ventilating power, as approximately one-third of 90.6. Accurately, the equivalent killing power in the car itself is $$\frac{1700}{5000} \times 90.6 = 30.8 \text{ per cent}$$

Had the three burners been installed so as to irradiate the air in the car itself above the eye level, this value would probably have been more than doubled, which shows the value of irradiated space in determining the amount of light intercepted by the living organisms. The same principle would apply in ventilating systems where it would be desirable to protect any part of a system from infection contributed by other parts, even though the most economical use of the light would not thereby be attained.

In general, it may be seen that the use of lights in ducts or air-conditioning channels is limited to the complete killing per minute of the microorganisms in the air passing the duct or chamber. If this killing were complete, that is, 100 per cent, it would be represented by the proportion of the air of the room recirculated through the duct or chamber. In ventilating practice, it is difficult to recirculate more than ten per cent, which has become a fairly well established standard. The maximum obtainable in such a system would, then, be ten per cent per minute killing power in the room. Since this way of utilizing the light is very inefficient because of the hooding effect of limited chambers, and because of the high velocity necessary, it follows that 100 per cent killing is extremely difficult to attain under these conditions, and the amount of killing obtained in any system previously contemplated would be far less than ten per cent. The best that we can determine from any disclosures accessible to us would indicate a value less than five per cent.

We claim:

1. Apparatus for protecting from infection by microorganisms an object exposed to such infection in the lower region of an air-containing room having, in combination, a source of ultraviolet light of 2800 Angstrom units or less positioned in an upper region of the room, the ultraviolet light emitted by the source being free to irradiate the whole said upper region of the room, whereby the major portion of the microorganisms in the said relatively large region of the room so subjected to the action of the ultraviolet light will be killed almost immediately, a screen positioned just below the source to protect the floor and the lower portions of the walls of the room from the action of the ultraviolet light, and means whereby the air in the room is caused to circulate from the floor upward to and past the source and downward again.

2. Apparatus for protecting from infection by microorganisms an object exposed to such infection in the lower region of an air-containing room having, in combination, a source of ultraviolet light of 2800 Angstrom units or less positioned in an upper region of the room, the ultraviolet light emitted by the source being free to irradiate the whole said upper region of the room, whereby the major portion of the microorganisms in the said relatively large region of the room so subjected to the action of the ultraviolet light will be killed almost immediately, and a screen positioned just below the source to protect the floor and the lower portions of the walls of the room from the action of the ultraviolet light, the screen having openings to permit air in the room to rise therethrough by reason of the heat generated by the source.

GORDON M. FAIR.
W. F. WELLS.